US008405021B2

(12) United States Patent
Anderson et al.

(10) Patent No.: US 8,405,021 B2
(45) Date of Patent: Mar. 26, 2013

(54) ULTRACOLD-MATTER SYSTEMS

(75) Inventors: Dana Z. Anderson, Boulder, CO (US); Evan Salim, Boulder, CO (US); Matthew Squires, Tewksbury, MA (US); Sterling Eduardo McBride, Princeton, NJ (US); Steven Alan Lipp, West Windsor, NJ (US); Joey John Michalchuk, Lambertville, NJ (US)

(73) Assignees: The Regents of the University of Colorado, Denver, CO (US); Sarnoff Corporation, Princeton, NJ (US)

( * ) Notice: Subject to any disclaimer, the term of this patent is extended or adjusted under 35 U.S.C. 154(b) by 412 days.

(21) Appl. No.: 12/600,821

(22) PCT Filed: May 19, 2008

(86) PCT No.: PCT/US2008/064150

§ 371 (c)(1),
(2), (4) Date: Apr. 20, 2010

(87) PCT Pub. No.: WO2009/025893

PCT Pub. Date: Feb. 26, 2009

(65) Prior Publication Data

US 2010/0200739 A1 Aug. 12, 2010

Related U.S. Application Data

(60) Provisional application No. 60/941,861, filed on Jun. 4, 2007, provisional application No. 60/938,990, filed on May 18, 2007.

(51) Int. Cl.

| | |
|---|---|
| ***H01S 1/00*** | (2006.01) |
| ***H01S 3/00*** | (2006.01) |
| ***H05H 3/02*** | (2006.01) |

(52) U.S. Cl. ..... 250/251; 250/428; 250/430; 250/423 R; 250/432 R; 250/436

(58) Field of Classification Search .................. 250/251, 250/428, 430, 423 R, 432 R, 436
See application file for complete search history.

(56) References Cited

U.S. PATENT DOCUMENTS

| | | | | |
|---|---|---|---|---|
| 6,495,822 | B2 * | 12/2002 | Hirano et al. | 250/251 |
| 7,186,385 | B2 * | 3/2007 | Ganguli et al. | 422/129 |
| 2005/0199871 | A1 * | 9/2005 | Anderson et al. | 257/14 |

OTHER PUBLICATIONS

International Application No. PCT/US2008/064150, International Search Report and Written Opinion, 10 pages, Feb. 10, 2009.
Du, Shengwang et al., "Atom-Chip Bose-Einstein Condensation in a Portable Vacuum Cell," Physical Review A, vol. 70, pp. 053606-1-053606-4, 2004.
Friedman, Nir et al., "Dark Optical Traps for Cold Atoms," Advances in Atomic, Molecular, and Optical Physics, vol. 48, pp. 99-151, 2002.
Williamson III, R. S. et al., "A Magneto-Optical Trap Loaded From a Pyramidal Funnel," Optics Express, vol. 3, No. 3, pp. 111-117, Aug. 3, 1998.

* cited by examiner

*Primary Examiner* — Jack Berman
*Assistant Examiner* — Meenakshi Sahu
(74) *Attorney, Agent, or Firm* — Perkins Coie LLP

(57) ABSTRACT

Cold-atom systems and methods of handling cold atoms are disclosed. A cold-atom system has multiple chambers and a fluidic connection between two of the chambers. One of these two chambers includes an atom source and the other includes an atom chip.

40 Claims, 8 Drawing Sheets

ULTRACOLD-MATTER SYSTEMS

CROSS REFERENCE TO RELATED APPLICATIONS

This application is a nonprovisional of each of the following U.S. provisional applications, the entire disclosure of each of which is incorporated herein by reference for all purposes: U.S. Prov. Pat. Appl. No. 60/938,990, entitled "Integrated Atom System: Part I," filed May 18, 2007; and U.S. Prov. Pat. Appl. No. 60/941,861, entitled "Portable, Miniature Multichamber Ultracold-Matter Vacuum System," filed Jun. 4, 2007.

This application is related to the concurrently filed PCT application entitled "CHANNEL CELL SYSTEM," naming Sterling Eduardo McBride, Steven Alan Lipp, Joey John Michalchuk, Dana Z. Anderson, Evan Salim, and Matthew Squires as inventors PCT/US08/64149, the entire disclosure of which is incorporated herein by reference for all purposes.

STATEMENT AS TO RIGHTS TO INVENTIONS MADE UNDER FEDERALLY SPONSORED RESEARCH AND DEVELOPMENT

This invention was made with government support under contract number W1911NF-04-1-0043 awarded by The U.S. Army Research Office. The government has certain rights in the invention.

BACKGROUND OF THE INVENTION

This application relates generally to Bose-Einstein condensates. More specifically, this application relates to a multichamber Bose-Einstein-condensate vacuum system.

Ultracold-matter science has been a blossoming field of atomic physics since the realization of a Bose-Einstein condensate in 1995. This scientific breakthrough has also opened the way for possible technical applications that include atom interferometry such as might be used for ultrasensitive sensors, time and frequency standards, and quantum information processing. One approach for developing technology involving ultracold matter, and particularly ultracold atoms, is the atom chip. Such chips are described in, for example, J. Reichel, "Microchip traps and Bose-Einstein condensation," Appl. Phys. B, 74, 469 (2002), the entire disclosure of which is incorporated herein by reference for all purposes. Such atom chips typically use currents in microfabricated wires to generate magnetic fields to trap and manipulate atoms. This chip approach allows for extremely tight confinement of the atoms and potential miniaturization of the apparatus, making the system compact and portable. But despite this, most atom-chip apparatus are of the same size scale as conventional ultracold atom systems, being of the order of one meter on one edge.

Current cold-atom and ion applications generally use an ultrahigh vacuum apparatus with optical access. The vacuum chamber of an atom chip typically provides an ultrahigh vacuum with a base pressure of less than $10^{-9}$ torr at the atom-chip surface. It also provides the atom chip with multi-line electrical connections between the vacuum side of the microchip and the outside. Optical access may be provided through windows for laser cooling, with a typical system having 1 $cm^2$ or more optical access available from several directions. A source of atoms or ions is also included.

Most conventional ultracold matter systems use multiple-chamber vacuum system: a high vapor-pressure region for the initial collection of cold atoms and an ultrahigh-vacuum region for evaporation and experiments. Chip-based systems have significantly relaxed vacuum requirements compared to their free-space counterparts, and many have used single vacuum chamber, modulating the pressure using light-induced atomic desorption. This approach may be problematic because it requires periodic reloading of the vacuum with the atom to be trapped, which in turn prevents continuous operation of the device. In addition, most ultracold matter vacuum systems use a series of pumps: typically a roughing pump, a turbo pump, one or more ion pumps, and one ore more titanium sublimation pumps. Such systems are large, costly, and poorly suited to applications for which small size, low weight, and low power consumption are emphasized.

There is accordingly a need in the art for improvements to systems for handling cold atoms.

BRIEF SUMMARY OF THE INVENTION

Embodiments of the invention thus provide a cold atom system that includes a plurality of chambers. A first of the chambers includes an atom source and a second of the atom chambers includes an atom chip. A fluidic connection is provided between the first of the chambers and the second of the chambers.

In one embodiment, the atom chip forms a portion of a wall of the second of the chambers. In various embodiments, at least one of the chambers may include an atom dispenser, a gas getter, an atom getter, and/or an ion pump. In certain instances, at least one of the chambers may be provided in fluid communication with a vacuum pump through an interface. At least one of the chambers may sometimes comprise a magnetic trap, may sometimes comprise a source of illumination, a detector, and/or may sometimes comprise an optical arrangement. In instances where the at least one of the chambers comprises an optical arrangement, the optical arrangement may be configured to form a standing light field from incident light.

A mechanism may also be provided to transport an atom through the fluidic connection from the first of the chambers to the second of the chambers. One example of such a mechanism includes a magnet motor.

In a second set of embodiments, a cold-atom system is provided with a plurality of chambers, with a first of the chambers including an atom chip and having a surface-to-volume ratio greater than 1:1 $m^{-1}$. A fluidic connection is provided between the first of the chambers and a second of the chambers. Various embodiments may include the features described above in connection with the first set of embodiments.

In a third set of embodiments, a vacuum cell for handling cold atoms is provided. The vacuum cell comprises a source of alkali-metal vapor, a source magneto-optical trap, a capture magneto-optical trap, and an atom chip. The source magneto-optical trap is in fluid communication with the source of alkali-metal vapor. The capture magneto-optical trap is in fluid communication with the source magneto-optical trap. The atom chip is coupled with the capture magneto-optical trap.

In such embodiments the vacuum cell may sometimes further comprise a gettering structure having an ion pump and a passive gettering pump. The gettering structure may further have a pinch-off tube. Either or both of the source and capture magneto-optical traps may comprise a transparent chamber. In some of these embodiments, the capture magneto-optical trap comprises at least one face of the atom chip, which may advantageously be sealed with the capture magneto-optical trap.

The source magneto-optical trap may comprise a two-dimensional magneto-optical trap having at least two counter-propagating pairs of mutually orthogonal laser beams and a third single beam propagating orthogonal to the pairs of mutually orthogonal laser beams. A source of pumping may be provided in fluid communication with the source magneto-optical trap. Merely by way of example, a pressure within the source magneto-optical trap may be between $10^{-8}$ and $10^{-6}$ torr.

In a fourth set of embodiments, a method is provided for handling cold atoms. A source of alkali-metal vapor is provided to a source magneto-optical trap. A cooled atom beam is generated from the source of alkali-metal vapor. The cooled beam is delivered to a capture magneto-optical trap. Atoms comprised by the delivered cooled atom beam are transferred to an atom chip.

In some embodiments, a substantial vacuum is maintained in the capture magneto-optical trap. The pressure in the source magneto-optical trap may be maintained between $10^{-8}$ and $10^{-6}$ torr. The cooled atom beam may be generated by counter-propagating at least two pairs of mutually orthogonal laser beams and propagating a third single beam orthogonal to the pairs of mutually orthogonal laser beams.

In a fifth set of embodiments, a method is provided of forming a Bose-Einstein condensate. An alkali-metal vapor is loaded into a first chamber. Atoms of the alkali-metal vapor are transferred from the first chamber to a second chamber having a lower internal pressure than an internal pressure of the first chamber. The atoms are cooled to achieve the Bose-Einstein condensate.

The atoms of the alkali-metal vapor may be transferred in some embodiments by forming a cloud of cold atoms in the first chamber and transferring the cloud from the first chamber to the second chamber. Cooling the atoms to achieve the Bose-Einstein condensate may comprise trapping atoms of the alkali-metal vapor in a magneto-optical trap. The magneto-optical trap may then be trapped in magnetic fields on an atom chip.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, reference labels include a numerical portion followed by a suffix; reference to only the base numerical portion of reference labels is intended to refer collectively to all reference labels that have that numerical portion but different suffices.

DETAILED DESCRIPTION OF THE INVENTION

Embodiments of the invention provide systems and methods for handling cold atoms and for generating Bose-Einstein condensates. As used herein, references to "cold" atoms refer to atoms in an environment having a thermodynamic temperature between 100 μK and 1 mK, such as may be achieved through laser cooling. References to "ultracold" atoms refer to atoms in an environment in which the temperature is not amenable to a thermodynamic definition because the physical conditions result in a dominance of quantum-mechanical effects, as is understood by those of skill in the art.

Figure 1:
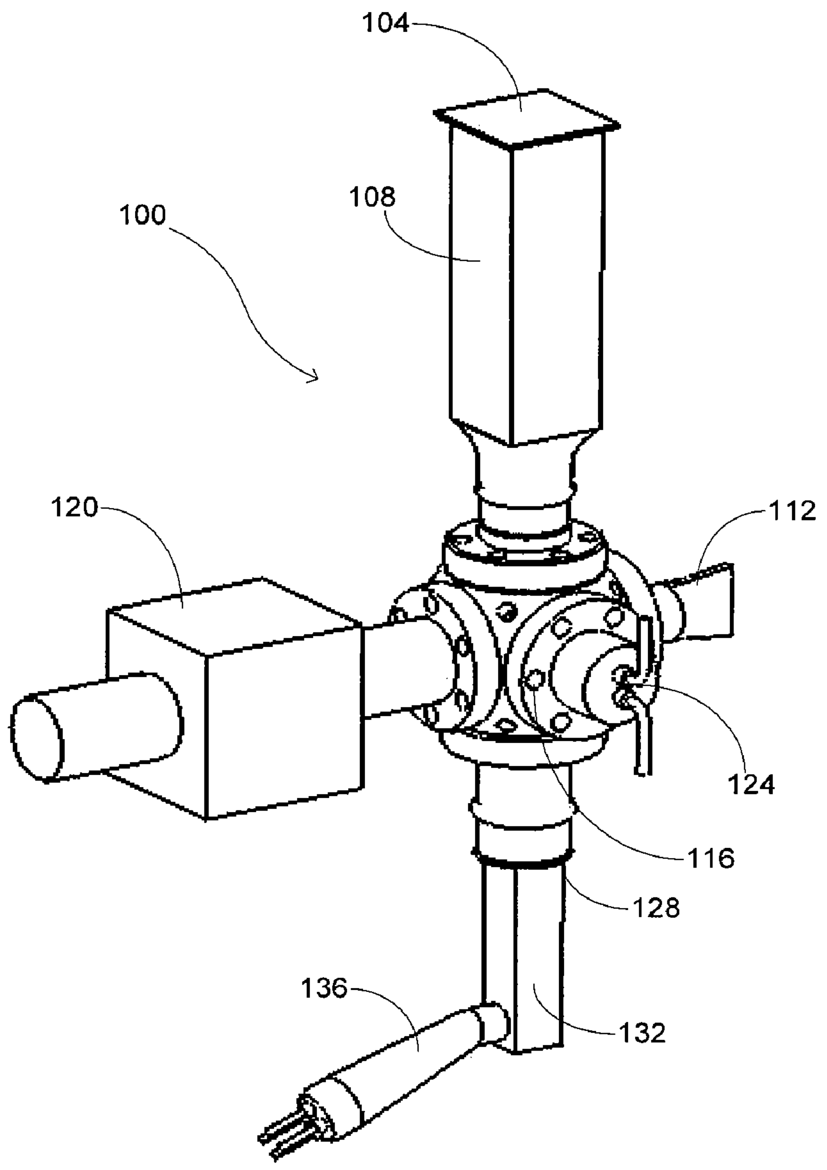
FIG. 1 provides a schematic illustration of a structure of a vacuum cell in accordance with an embodiment of the invention.

One illustrative embodiment is shown in FIG. 1, which illustrates a structure of a vacuum cell 100 for handling cold atoms. The cell 100 has three principal sections: a source magneto-optical section, a capture magneto-optical section, and a pumping/gettering section. The magneto-optical section comprises a first magneto-optical cell 132, which may be transparent to provide optical access to an atomic vapor. A source tube 136 may be attached to the first magneto-optical cell 132 in such a way that it does not obstruct the desired optical access. The source tube 136 contains a source of some alkali-metal vapor such as a dispenser, and may sometimes also include a getter to aid in the elimination of hydrogen and other undesirable gases that are detrimental to the production of ultracold atoms. Additional details of alkali-metal dispensers are provided in U.S. Pat. Publ. No. 2006/0257296 and U.S. patent application Ser. No. 12/121,068, entitled "Alkaline Metal Dispensers and Uses for Same," filed May 15, 2008, the entire disclosures of both of which are incorporated herein by reference for all purposes. Electrical feedthroughs can be provided in the source tube 136 for instances where the metal vapor is provided by a dispenser that is activated by heat produced using an electrical current. While the source tube 132 is shown as an appendage, it may alternatively be integrated directly into the first magneto-optical trap 132. The alkali-metal vapor pressure in the first magneto-optical trap 132 may be relatively high, being on the order of $10^{-8}$-$10^{-6}$ torr in some embodiments. It is noted that such a pressure is merely provided as an example of a pressure used in a specific embodiments. Other embodiments may use pressures that are higher or lower; the invention is not limited to the use of any particular pressure.

The source magneto-optical trap 132 is used to deliver a precooled source of atoms to the second, capture magneto-optical trap 108. The second magneto-optical trap 108 may also comprise a transparent cell. In one embodiment, a cooled atom beam is produced by a 2D+ magneto-optical-trap configuration that comprises at least two counterpropagating pairs of mutually orthogonal laser beams plus a third single beam propagating orthogonal to the other pairs. The source magneto-optical section is isolated from the other two sections by a disk 128 that comprises an aperture through which the cooled atom beam is transmitted, but which prevents the majority of thermal atoms from leaving the source magneto-optical section. The disk may be a silicon disk in some embodiments, and the aperture may comprises a small hole, typically having a diameter on the order of 0.2-1.0 mm. In certain embodiments, there is no active pump attached directly to the source magneto-optical trap chamber 132.

The capture magneto-optical trap region may also comprise a transparent chamber 108. Contained within the chamber 108 is at least one face of an atom chip 104, and some mechanism for connecting to the electrical contacts on the vacuum side of the chip 104. Such a connection may be provided as an integral part of the chip in some embodiments or may be provided as an attachment that connects to electrical feedthroughs near the chip 104. Once the capture magneto-optical trap 108 is loaded, the atoms are transferred to the atom chip 104. In one embodiment, the atom chip 104 is used to seal an end of the chamber 108, which is perpendicular to the beam of atoms out of the 2D+ magneto-optical trap 132, and the electrical connections to the chip 104 are made with vias that carry current through the substrate of the atom chip 104.

The capture magneto-optical trap 108 may be connected to a pumping/gettering section. This section comprises an ion pump 120 and passive gettering pumps such as nonevaporable getters or titanium sublimation pumps. It may also comprise a connection to a pinch-off tube 112, which allows for the vacuum cell to be prepared on a larger pumping system before use. Electrical feedthrough for nonevaporable getter 124 may be provided through a flange 116. The pumping/gettering section is connected to the source magneto-optical trap 132 and capture magneto-optical trap 108 sections in such a way that there is high conductance between the pumps and the capture magneto-optical trap 108, and low conductance between the pumps and the source magneto-optical trap 132. In this case, high and low conductance are defined relative to the pumping speed of the pumps. In a particular embodiment, the titanium sublimation pump is omitted because of its large size and high power requirements. The pumping/gettering section is along the axis of the atomic beam from the source magneto-optical trap 132 and between the two magneto-optical trap chambers 132 and 108.

In one embodiment, this vacuum cell 100 is assembled without the use of glues or epoxies that are exposed to the vacuum. This allows higher bakeout temperatures during vacuum processing, making the pumping procedure faster and more effective than would be permitted if epoxies were present. It also increases the lifetime of the device because there are no contaminants introduced to the vacuum as the epoxy breaks down.

In some embodiments, the chambers have a surface-to-volume ratio that is greater than 1:1 $m^{-1}$, have a surface-to-volume ratio that is greater than 2:1 $m^{-1}$, have a surface-to-volume ratio that is greater than 4:1 $m^{-1}$, have a surface-to-volume ratio that is 6:1 $m^{-1}$, or have a surface-to-volume ratio that is greater than 10:1 $m^{-1}$. When the inventors were initially confronted with attempting to produce a structure having such a surface-to-volume ratio, they were confronted with the concern that the fact that miniaturization of the components would require a general increase in the surface-to-volume ratio of the components and that it might be impossible to maintain adequate volume. It was unexpected that fabrication at the recited surface-to-volume ratio succeeded in structures that could be used in the devices described herein.

Some of the structures described herein make use of “microchannels” to couple different chambers fluidicly. References to such “microchannels” are intended to refer to structures that have a groove cut into a flat surface that is covered by another layer, such as where a groove has been cut into a silicon surface that is covered by glass. Further details of such microchannels are described in concurrently filed PCT application entitled “CHANNEL CELL SYSTEM,” by Sterling Eduardo McBride, Steven Alan Lipp, Joey John Michalchuk, Dana Z. Anderson, Evan Salim, and Matthew Squires PCT/US08/64149, the entire disclosure of which has been incorporated herein by reference for all purposes.

Figure 2:
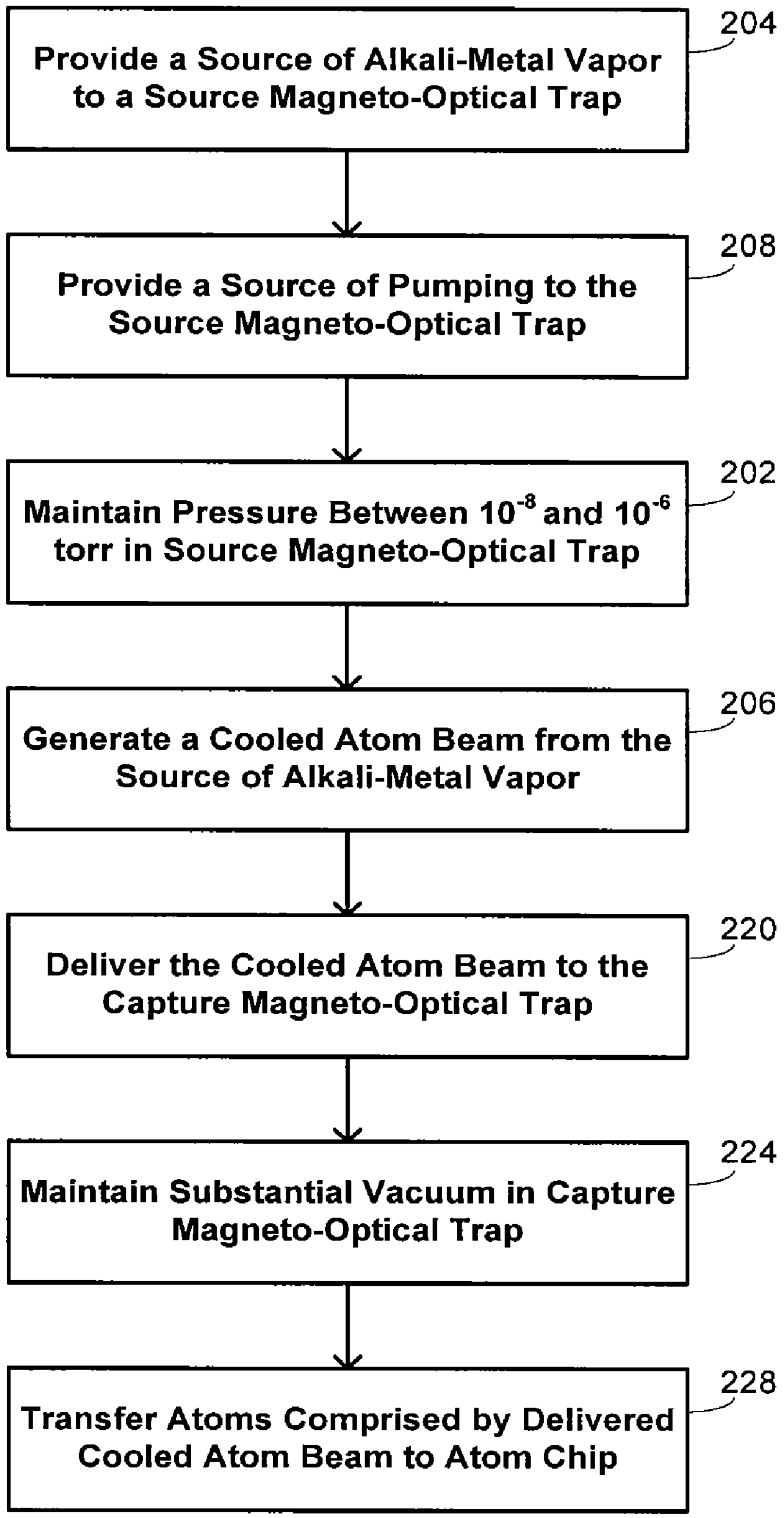
FIG. 2 is a flow diagram summarizing methods of the invention for handling cold atoms in various embodiments.

FIG. 2 provides a summary of various methods of handling cold atoms in accordance with the invention using a flow diagram. While this diagram calls out certain steps to be performed and sets forth an illustrative order for performing the steps, this is not intended to be limiting. In different embodiments, additional steps may be performed, some of the steps may be omitted, and/or the steps may be performed in a different order.

The method begins at block 204 by providing a source of alkali-metal vapor to a source magneto-optical trap. A source of pumping may also be provided to the source magneto-optical trap at block 208. A pressure is maintained in the source magneto-optical trap between $10^{-8}$ and $10^{-6}$ torr, as indicated at block 212. A cooled atom beam is generated from the source of alkali-metal vapor at block 216 and delivered to a capture magneto-optical trap at block 220. The capture magneto-optical trap is maintained substantially at vacuum as indicated at block 224. Atoms comprised by the delivered cooled atom beam are transferred to the atom chip at block 228.

Because of features of its configuration, the system described herein may in some embodiments be made substantially more compact and portable than conventional ultracold atom systems. It is nonetheless capable of performance equal to or better than conventional atom-chip systems, as assessed in terms of the number of ultracold atoms, and the speed and repetition rate at which they may be produced. For example, while the system may be constructed with a volume on the order of 1000 times smaller than conventional systems, one embodiment provides a throughput of about $2.5\times10^{6}$ atoms/min, deviating by only about a factor of four from certain high-throughput conventional systems that are three orders of magnitude larger.

Figure 3:
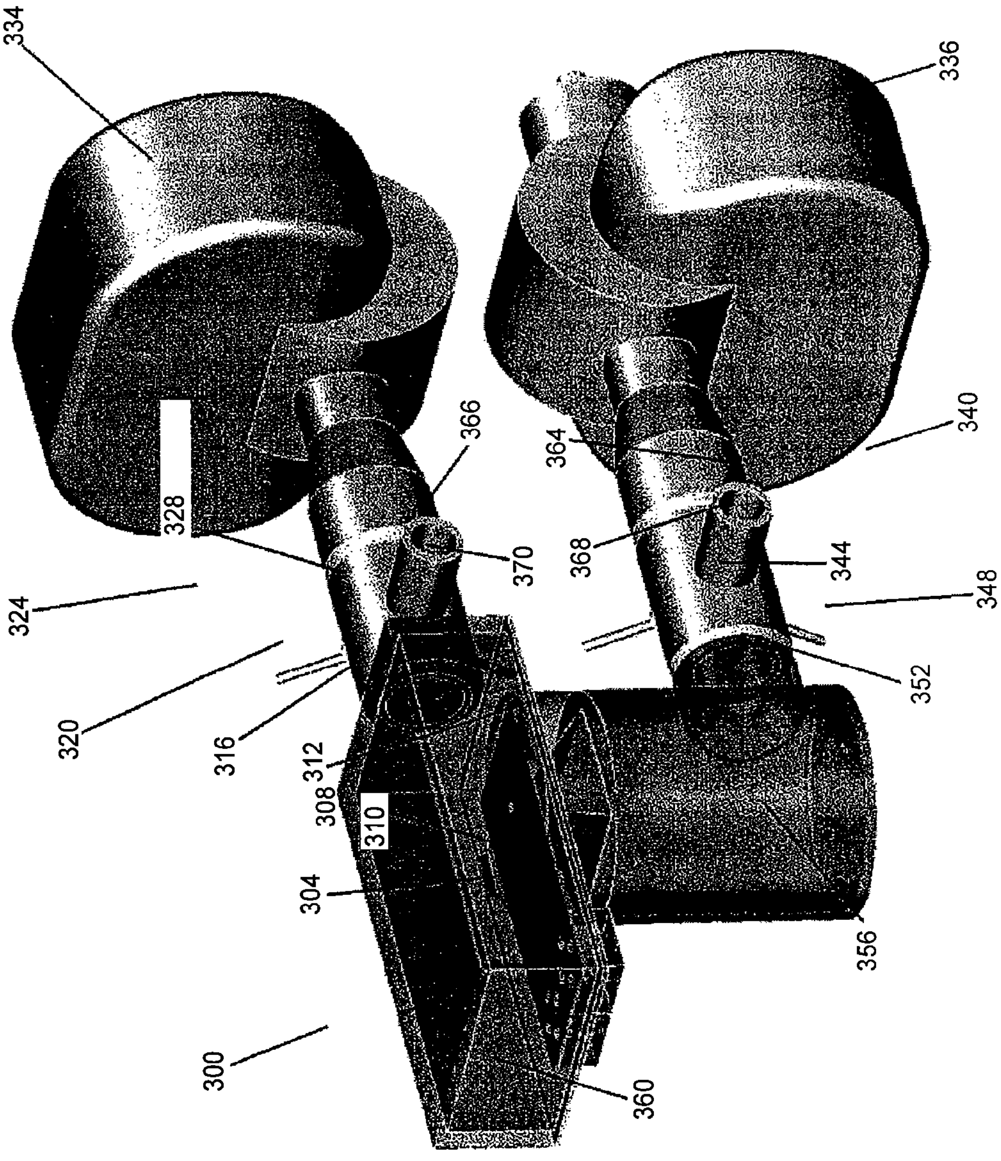
FIG. 3 is an illustration of a cold-atom system made in accordance with an embodiment of the invention.

Another configuration for a cold-atom system embodied by the invention is illustrated in FIG. 3. In this configuration, the system comprises a cell assembly 300, a high-pressure port 340, and a low-pressure port 324. The cell assembly 300 comprises a plurality of chambers and/or cells, examples of which may include a high-pressure chamber or cell 356 and a low-pressure chamber or cell 360. As used herein, references to “high” and “low” pressures in describing such chambers are intended to be relative, with such designations indicating merely that a pressure in the high-pressure chamber or cell 356 is higher than a pressure in the low-pressure chamber or cell 360. Such designations are not intended to limit the absolute pressure in any particular chamber or cell to any particular value or range of values. Merely by way of illustration, in one embodiment, the pressure in the high-pressure chamber or cell 356 is on the order of $10^{-8}$-$10^{-6}$ torr and the pressure in the low-pressure chamber or cell 360 is on an order less than $10^{-1}$ torr. In one specific embodiment, the high-pressure chamber or cell 356 comprises a pyramid mirror configuration, but various other configurations may be used in alternative embodiments.

The chambers or cells 356 and 360 are connected by channels and/or apertures as described in detail above. In addition, in some instances, the cell assembly 300 may sometimes include manifolds, such as illustrated in the embodiment of FIG. 3 with manifolds 352 and 316. These manifolds may be fabricated from a variety of different materials that include doped quartz, doped $SiO_2$, or any other form of doped glass in addition to other materials.

The cell assembly 300 may additionally comprise a substrate 304, which may sometimes be provided as an atom chip. The substrate typically comprises a semiconductor such as elemental silicon, but this is not a requirement of the invention and may have a different composition in other embodiments. The particular materials used in fabrication of the cell assembly 300 may render certain techniques for assembly of the structure more or less appropriate. For instance, when the components of the cell assembly 300 comprise silicon and glass, anodic boding may be used to assemble the structure in an integrated fashion. Additional details of anodic bonding are provided in U.S. Pat. Publ. No. 2006/0267023, the entire disclosure of which is incorporated herein by reference for all purposes. As will be known to those of skill in the art, anodic bonding is a technique in which the components to be bonded are placed between metal electrodes at an elevated temperature, with a relatively high dc potential being applied between the electrodes to create an electric field that penetrates the substrates. Dopants in at least one of the components are thereby displaced by application of the electric field, causing a dopant depletion at a surface of the component that renders it highly reactive with the other component to allow the creation of a chemical bond. Alternative assembly techniques that may be used, particularly different kinds of materials are used, include direct bonding techniques, intermediate layer bonding techniques, and other bonding techniques. In other instances, other assembly techniques that use adhesion, including the use of a variety of elastomers, thermoplastic adhesives, or thermosetting adhesives.

The high-pressure port 340 is provided in fluid communication with the high-pressure chamber or cell 356 and the low-pressure port 324 is provided in fluid communication with the low-pressure chamber or cell 360. Each of these ports 340 and 324 may also be fabricated from a variety of different materials and have different structures. In one embodiment, both ports 340 and 324 are fabricated from stainless steel, although it is also not required by the invention that they be fabricated from the same material as each other.

In the embodiment of FIG. 3, the high-pressure port 340 comprises a high-pressure-port chamber 344 that has electrical feedthroughs 348, a high-pressure-port pinch-off tube 368, a high-pressure-port ion pump 336, and a high-pressure-port pumping port 384. The low-pressure port 324 has a similar structure, comprising a low-pressure-port chamber 328 that has electrical feedthroughs 320, a low-pressure-port pinch-off tube 330, a low-pressure-port ion pump 334, and a low-pressure port pumping port 366. The high-pressure port 340 and the low-pressure port 324 are respectively coupled with the manifolds 352 and 316. Such coupling may be achieved in a variety of different ways, depending in part on the specific materials used in the structure. For instance, in one embodiment, the ports 340 and 324 are respectively coupled with the manifolds 352 and 316 by a glass-metal transition.

Figure 4:
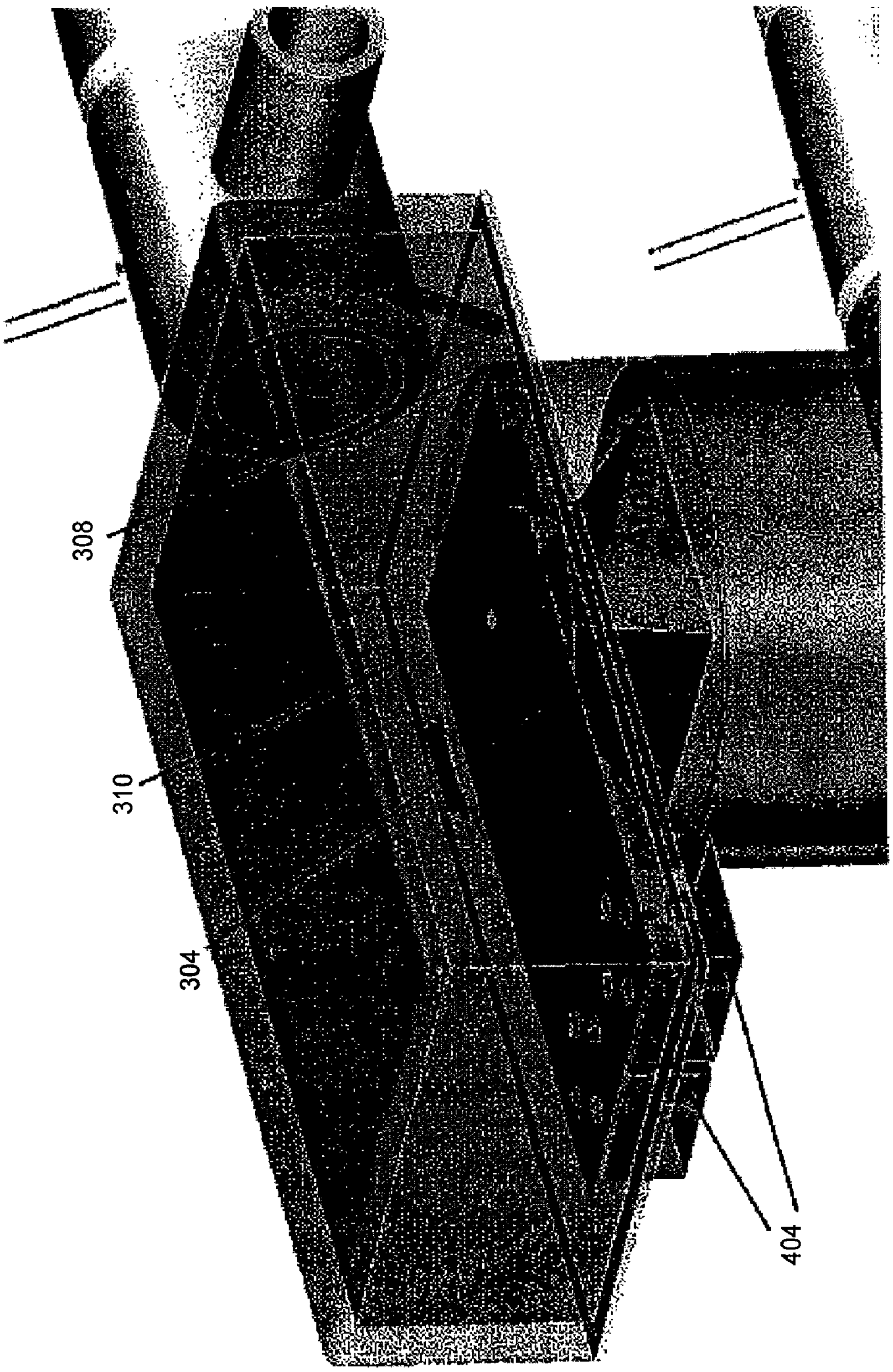
FIG. 4 provides a detailed view of the cold-atom system of FIG. 3.

A gas getter 310 and an alkali-metal dispenser 308 are disposed functionally as part of the low-pressure port 324, as is more clearly visible from the detailed view of the low-pressure port 324 shown in FIG. 4. A similar gas getter and alkali-metal dispenser are disposed functionally as port at the high-pressure port 340. In specific embodiments, the alkali-metal dispensers comprise rubidium dispensers, but dispensers of other alkali metals may be used in alternative embodiments.

The substrate 304 may be configured as an atom chip having electrically conducting traces that provide magnetic fields for the manipulation and trapping of cold atoms. In a specific embodiment, the substrate 304 comprises a silicon substrate, although alternative materials may be used for the substrate 304 in different embodiments. The system is typically configured with an adequate interior vacuum. This may be accomplished by fluidic coupling of the pumping ports 366 and 384 with an external vacuum pump system, allowing vacuum processing of the system. Once an adequate vacuum is attained within the atom system, the pinch-off tubes 330 and 368 are closed; closure of the pinch-off tubes may be achieved by crimping pinch-off tubes 330 and 368 made of a metal such as copper, but flame-sealing pinch-off tubes 330 and 368 made of a glass, or by any other technique suitable for the material comprised by the pinch-off tubes 330 and 368.

In embodiments of the invention, the low-pressure chamber 360 includes optical devices 404 for detection and manipulation of atoms, as illustrated in the detailed view of FIG. 4. Such optical devices may include configurations of optically dispersive elements such as prisms or gratings, focusing and collimation elements such as lenses, and reflective elements such as mirrors. The optical devices are used to collect light from the interior of the low-pressure chamber 360 at the same time that an ultrahigh vacuum is maintained in the interior of the low-pressure chamber. Light inside the low-pressure chamber 360 is thus capable of being used for atom absorption or fluorescence measurements.

Figure 5:
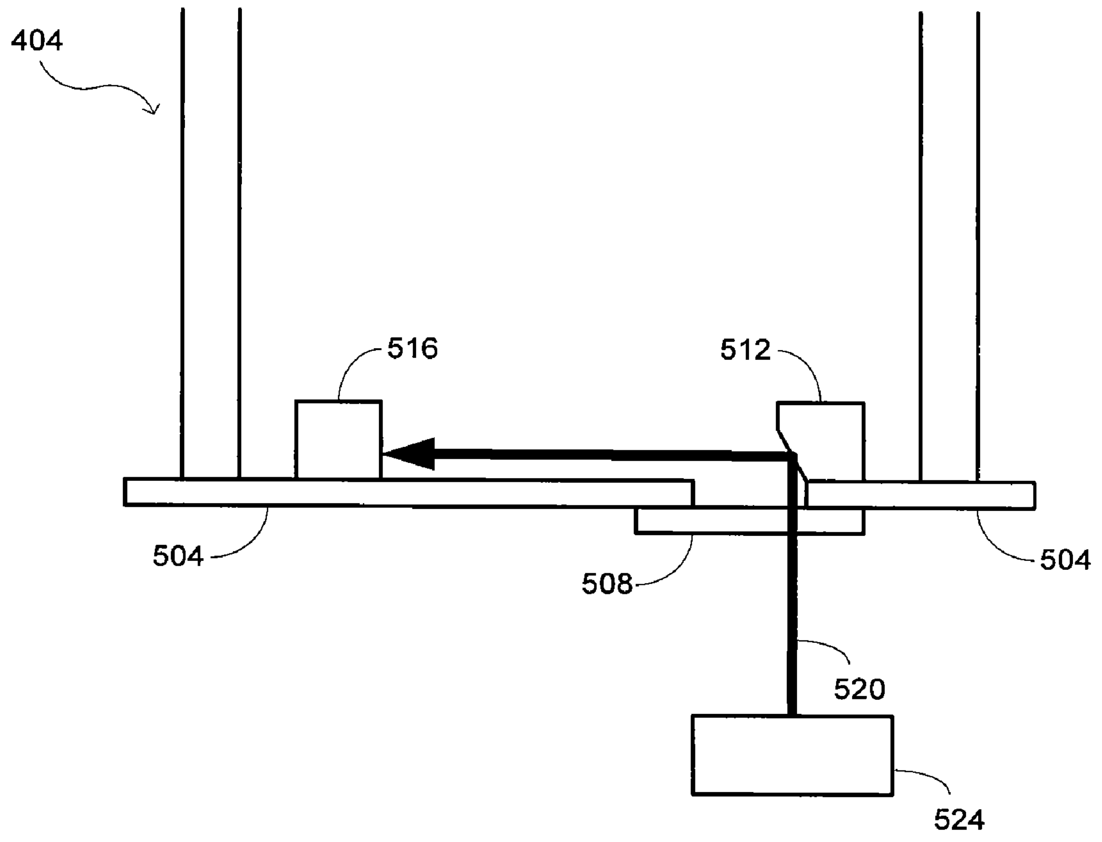
FIG. 5 provides an illustration of an optical device used in embodiments of the invention.

One illustrative example of an optical device that may be included within the low-pressure chamber 360 is shown schematically in FIG. 5, although many other configurations are possible in alternative embodiments. In this particular configuration, the optical device 404 comprises a prism 512, a mirror 516, an optical window 508, and a fiber/grin lens assembly 524. An incident light beam 520 from the fiber/grin lens assembly 524 is turned 90 degrees by the prism 512 and reflected by the mirror 516 so that a standing light field is formed between the prism 512 and the mirror 516. Such a standing light field may be used as a splitter for cold atoms, thereby providing the functionality of an atom interferometer within the low-pressure chamber 360.

Figure 6:
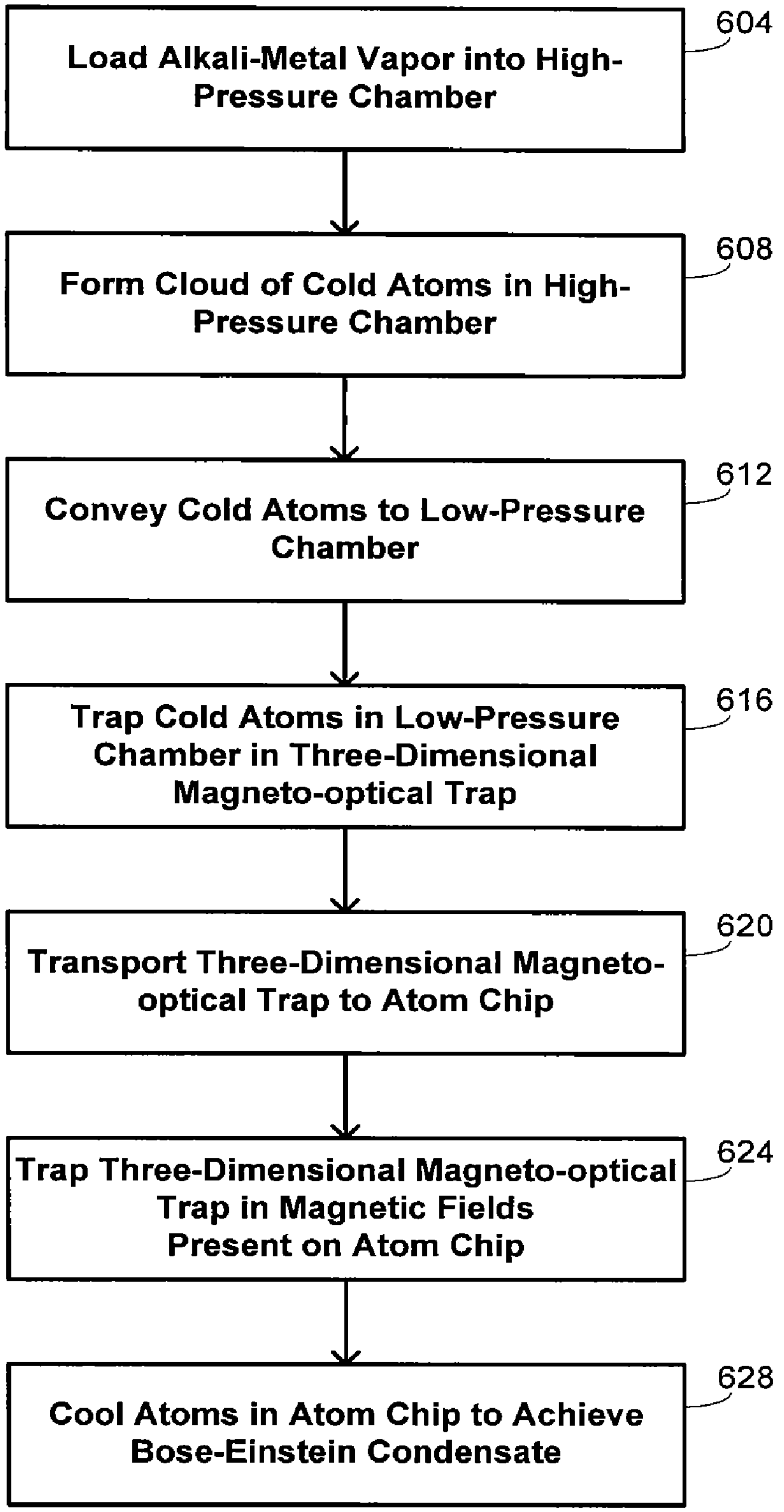
FIG. 6 is a flow diagram summarizing methods of the invention for generating a Bose-Einstein condensate in accordance with embodiments of the invention.

FIG. 6 is a flow diagram that summarizes one mode of operation of the cold-atom system of FIG. 3. It is noted that while specific steps are indicated in this flow diagram in a particular order that variations may be made without departing from the intended scope of the invention. For example, the order of the steps in the drawing is not intended to be limiting and in some alternative embodiments, the steps might be performed in a different order. Also, the specific identification of steps in FIG. 6 is not intended to be limiting; in alternative embodiments, some of the steps might be omitted and/or additional steps not specifically identified in the drawing might also be included. Furthermore, while FIG. 6 is discussed in connection with the cold-atom system of FIG. 3, it is noted that the method may be practiced with other system structures.

At block 604 of FIG. 6, alkali-metal vapor is loaded into the high-pressure chamber 356 from the dispenser. A cloud of cold atoms is formed in the high-pressure chamber 356 at block 608, which may be accomplished using conventional cold-atom techniques known to those of skill in the art such as by using a magneto-optical trap. In one specific embodiment, a pyramid magneto-optical trap configuration is used. The cold atoms are conveyed at block 612 from the high-pressure chamber 356 to the low pressure chamber 360 as part of the magneto-optical trap. Once the cold atoms reach the low-pressure chamber 360, the cloud is trapped in a three-dimensional magneto-optical trap as indicated at block 616. This may again be accomplished using convention cold-atom techniques that are known to those of skill in the art.

At block 620, this three-dimensional magneto-optical trap is transported to the atom chip of the substrate 304 and trapped at block 624 in magnetic fields that are present on the atom chip. Conventional cooling techniques known to those of skill in the art are applied at block 628 to condense the atoms within the atom chip and thereby form a Bose-Einstein condensate.

Figure 7:
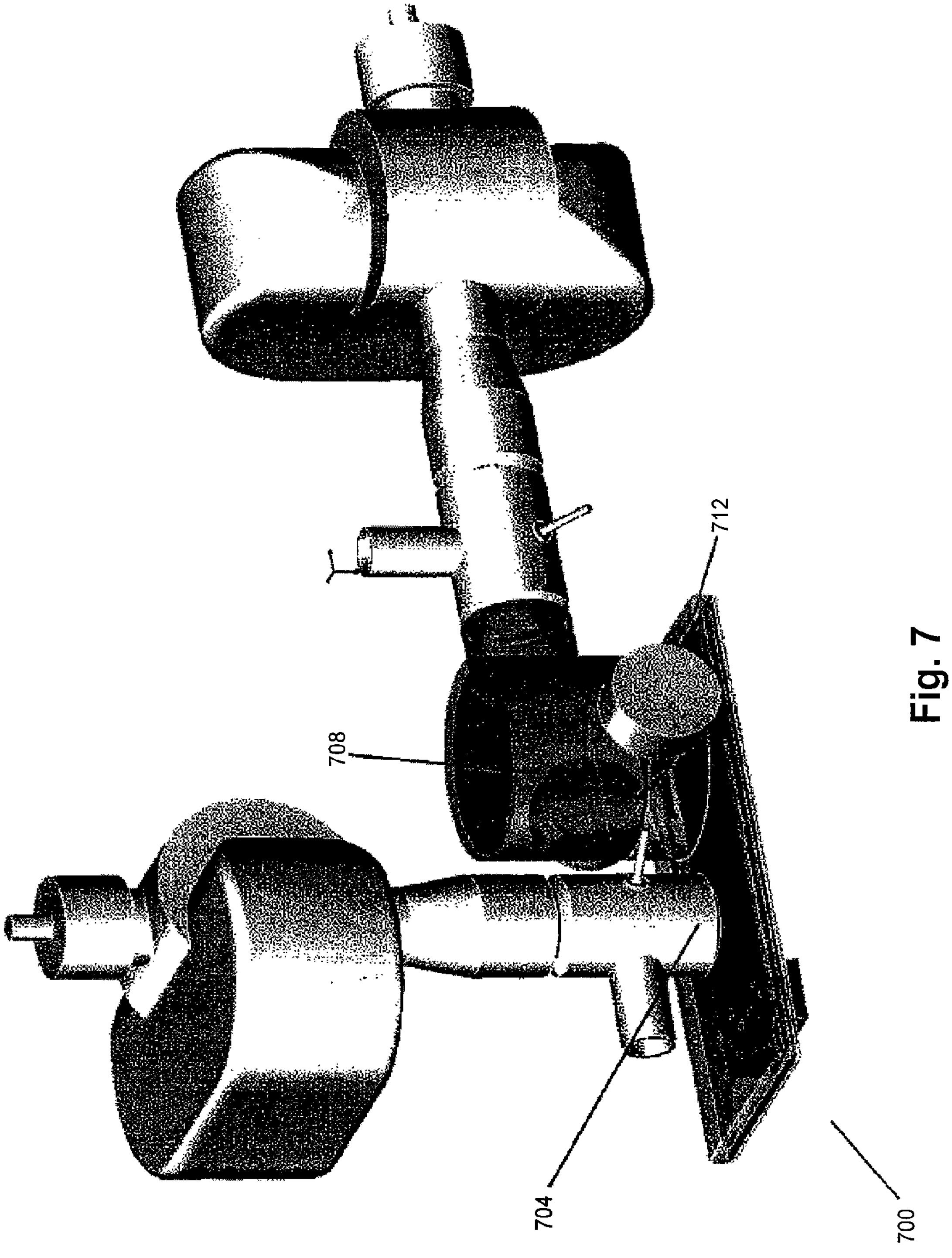
FIG. 7 is an illustration of another embodiment of a cold-atom system in accordance with the invention.

A variation of the cold-atom system of FIG. 3 is illustrated with the drawing of FIG. 7. In this embodiment, a cell-assembly 700 is provided that has the same functional architecture as described in connection with FIG. 3. This embodiment differs, however, in the location of the manifold 704 and in the interface between the high-pressure chamber 712 and the low-pressure chamber 708. It is noted, however, that the method described in connection with FIG. 6 may equally be implemented with the structure of the system shown in FIG. 7 as with the structure of the system shown in FIG. 3.

Figure 8:
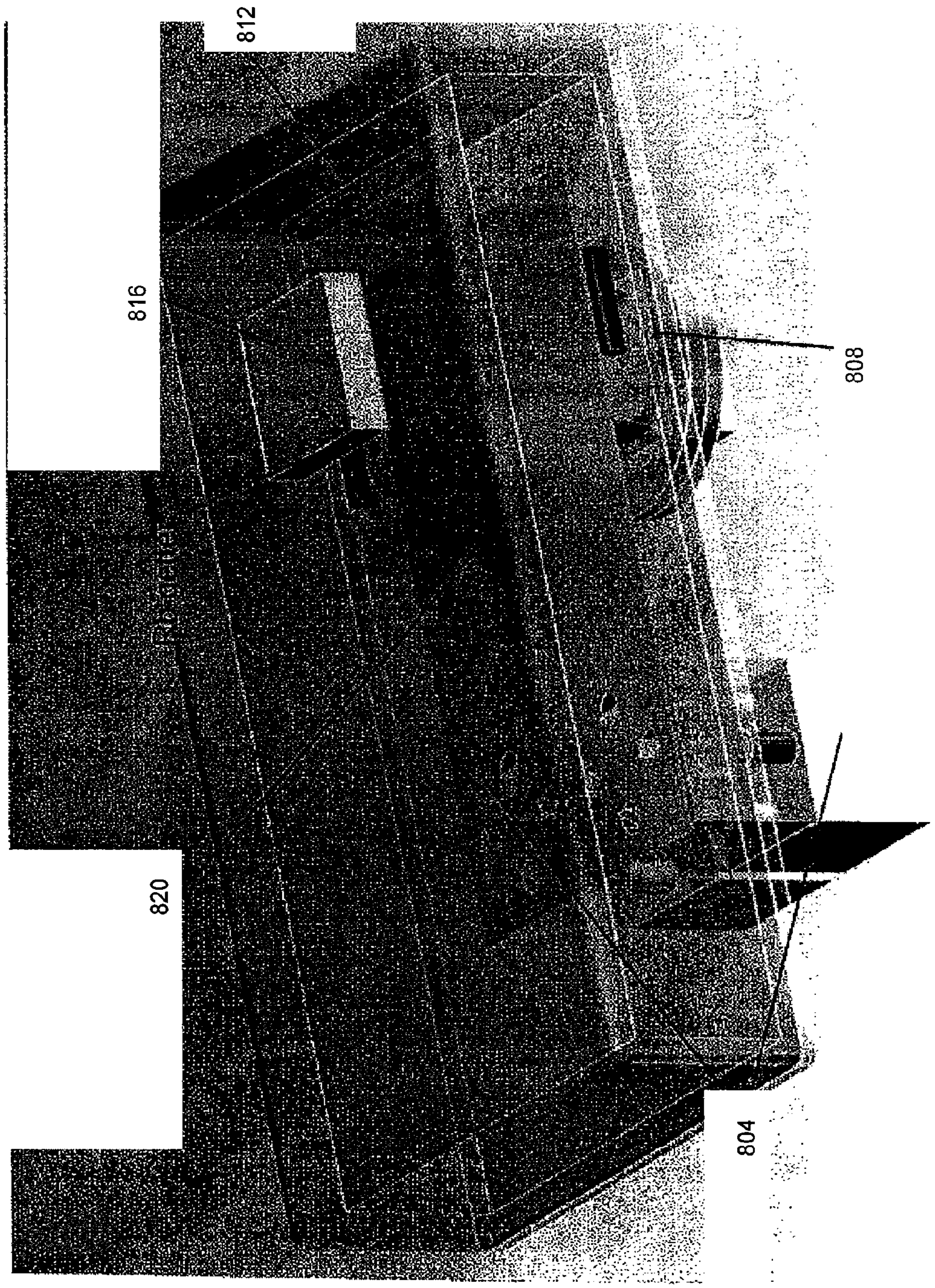
FIG. 8 is an illustration of still a further embodiment of a cold-atom system in accordance with the invention.

A further embodiment is shown in FIG. 8. This embodiment may be considered to be an integrated version of the embodiments of FIGS. 3 and 7. The drawing shows the high-pressure chamber 808 and the low-pressure chamber 812 so that the basic method of FIG. 6 may also be implemented with this structure. Atom waveguides and trapping components of the atom chip are designated with reference number 820. The optical devices described in connection with FIGS. 3-5 are denoted with reference number 804, and the structure also includes an extraction laser 816 that may be used to move atoms from the high-pressure chamber to the low-pressure chamber. One difference of this embodiment from the embodiments of FIGS. 3 and 7 is the elimination of ion pumps and miniaturization of the high-pressure and low-pressure ports.

Features of note with the various embodiments described herein include differential vacuum pumping between the high-pressure and low-pressure chambers, as well as light isolation, thermal isolation, and magnetic isolation between the chambers. The various structures provided a platform for integration of optics and laser sources directly on the device.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A cold-atom system comprising:
- a plurality of chambers, a first of the chambers including an atom source to produce cooled atoms and a second of the chambers including an atom chip for the manipulation and trapping of cold atoms; and
- a fluidic connection between the first of the chambers and the second of the chambers to allow at least some of the cooled atoms to be transported to the atom chip.

2. The cold-atom system recited in claim 1 wherein the atom chip forms a portion of a wall of the second of the chambers.

3. The cold-atom system recited in claim 1 wherein at least one of the chambers includes a gas getter.

4. The cold-atom system recited in claim 1 wherein at least one of the chambers includes an ion pump.

5. The cold-atom system recited in claim 1 wherein at least one of the chambers is in fluid communication with a vacuum pump through an interface.

6. The cold-atom system recited in claim 1 wherein at least one of the chambers comprises a magnetic trap.

7. The cold-atom system recited in claim 1 further comprising a mechanism to transport an atom through the fluidic connection from the first of the chambers to the second of the chambers.

8. The cold-atom system recited in claim 7 wherein the mechanism comprises a magnetic motor.

9. The cold-atom system recited in claim 1 wherein at least one of the chambers comprises a source of illumination.

10. The cold-atom system recited in claim 1 wherein at least one of the chambers comprises an optical arrangement.

11. The cold-atom system recited in claim 10 wherein the optical arrangement is configured to form a standing light field from incident light.

12. The cold-atom system recited in claim 1 wherein at least one of the chambers comprises a detector.

13. A cold-atom system comprising:
- a plurality of chambers, a first of the chambers including an atom chip and having a surface-to-volume ratio greater than 1:1 $m^{-1}$; and
- a fluidic connection between the first of the chambers and a second of the chambers to allow at least some atoms to be transported from the first of the chambers to the atom chip.

14. The cold-atom system recited in claim 13 wherein the second of the chambers includes an atom source.

15. The cold-atom system recited in claim 13 wherein the atom chip forms a portion of a wall of the first of the chambers.

16. The cold-atom system recited in claim 13 wherein at least one of the chambers includes a gas getter.

17. The cold-atom system recited in claim 13 wherein at least one of the chambers includes an atom getter.

18. The cold-atom system recited in claim 13 wherein at least one of the chambers includes an ion pump.

19. The cold-atom system recited in claim 13 wherein at least one of the chambers is in fluid communication with a vacuum pump through an interface.

20. The cold-atom system recited in claim 13 wherein at least one of the chambers includes a magnetic trap.

21. A vacuum cell for handling cold atoms, the vacuum cell comprising:
- a source of alkali-metal vapor;
- a source magneto-optical trap in fluid communication with the source of alkali-metal vapor;
- a capture magneto-optical trap in fluid communication with the source magneto-optical trap, wherein the source magneto-optical trap delivers a precooled source of atoms to the capture magneto-optical trap;
- an atom chip in fluid communication with the capture magneto-optical trap to allow some of the atoms to be transported to the atom chip, wherein the atom chip is capable of manipulating and trapping cold atoms; and
- a barrier through which a cooled atom beam can be transmitted, wherein the barrier isolates the source magneto-optical trap from the capture magneto-optical trap and prevents the majority of the atoms from leaving the source magneto-optical trap.

22. The vacuum cell recited in claim 21 further comprising a gettering structure having an ion pump and a passive gettering pump.

23. The vacuum cell recited in claim 22 wherein the gettering structure further has a pinch-off tube.

24. The vacuum cell recited in claim 21 wherein the source magneto-optical trap comprises a transparent chamber.

25. The vacuum cell recited in claim 21 wherein the capture magneto-optical trap comprises a transparent chamber.

26. The vacuum cell recited in claim 21 wherein the capture magneto-optical trap comprises at least one face of the atom chip.

27. The vacuum cell recited in claim 26 wherein the atom chip seals the capture magneto-optical trap.

28. The vacuum cell recited in claim 21 wherein the source magneto-optical trap comprises a two-dimensional magneto-optical trap having at least two counter-propagating pairs of mutually orthogonal laser beams and a third single beam propagating orthogonal to the pairs of mutually orthogonal laser beams.

29. The vacuum cell recited in claim 21 wherein the source magneto-optical trap comprises a pyramid magneto-optical trap.

30. The vacuum cell recited in claim 21 further comprising a source of pumping in fluid communication with the source magneto-optical trap.

31. The vacuum cell recited in claim 21 wherein a pressure within the source magneto-optical trap is between $10^{-8}$ and $10^{-6}$ torr.

32. A method for handling cold atoms, the method comprising:

providing a source of alkali-metal vapor to a source magneto-optical trap that provides optical access to the alkali-metal vapor;

generating a cooled atom beam from the source of alkali-metal vapor;

delivering the cooled atom beam to a capture magneto-optical trap having a lower pressure than the source magneto optical trap; and transferring atoms comprised by the delivered cooled atom beam to an atom chip.

33. The method recited in claim 32 further comprising pumping from the capture magneto-optical trap to maintain a substantial vacuum in the capture magneto-optical trap.

34. The method recited in claim 32 further comprising maintaining a pressure within the source magneto-optical trap between $10^{-8}$ and $10^{-6}$ torr.

35. The method recited in claim 32 wherein generating the cooled atom beam comprises:

counter-propagating at least two pairs of mutually orthogonal laser beams; and propagating a third single beam orthogonal to the pairs of mutually orthogonal laser beams.

36. The method recited in claim 32 further comprising providing a source of pumping to the source magneto-optical trap.

37. A method of forming a Bose-Einstein condensate, the method comprising:

loading an alkali-metal vapor into a first chamber that is in fluid communication with a second chamber that is thermally and magnetically isolated form the first chamber;

transferring atoms of the alkali-metal vapor from the first chamber to the second chamber having a lower internal pressure than an internal pressure of the first chamber; and cooling the atoms to achieve the Bose-Einstein condensate.

38. The method recited in claim 37 wherein transferring atoms of the alkali-metal vapor comprises:

forming a cloud of cold atoms in the first chamber; and transferring the cloud of cold at cold atoms from the first chamber to the second chamber.

39. The method recited in claim 37 wherein cooling the atoms to achieve the Bose-Einstein condensate comprises trapping atoms of the alkali-metal vapor in a magneto-optical trap.

40. The method recited in claim 39 wherein cooling the atoms to achieve the Bose-Einstein condensate further comprises trapping the magneto-optical trap in magnetic fields present on an atom chip.

* * * * *

UNITED STATES PATENT AND TRADEMARK OFFICE

CERTIFICATE OF CORRECTION

PATENT NO. : 8,405,021 B2
APPLICATION NO. : 12/600821
DATED : March 26, 2013
INVENTOR(S) : Dana Z. Anderson It is certified that error appears in the above-identified patent and that said Letters Patent is hereby corrected as shown below:

In the Specification:

In column 6, line 51, replace "$10^{-1}$" with -- $10^{-11}$ --.

Signed and Sealed this
Second Day of August, 2016

Michelle K. Lee
*Director of the United States Patent and Trademark Office*